US011078326B2

(12) United States Patent
Guntermann

(10) Patent No.: US 11,078,326 B2
(45) Date of Patent: Aug. 3, 2021

(54) COMPOSITIONS USEFUL FOR THE FORMATION OF AN ANTISTATIC LAYER OR AN ELECTROMAGNETIC RADIATION SHIELD

(71) Applicant: Heraeus Deutschland GmbH & Co. KG, Hanau (DE)

(72) Inventor: Udo Guntermann, Krefeld (DE)

(73) Assignee: Heraeus Deutschland GmbH & Co. KG, Hanau (DE)

( * ) Notice: Subject to any disclaimer, the term of this patent is extended or adjusted under 35 U.S.C. 154(b) by 0 days.

(21) Appl. No.: 16/479,444

(22) PCT Filed: Jan. 11, 2018

(86) PCT No.: PCT/EP2018/050661
§ 371 (c)(1),
(2) Date: Jul. 19, 2019

(87) PCT Pub. No.: WO2018/137934
PCT Pub. Date: Aug. 2, 2018

(65) Prior Publication Data
US 2019/0375888 A1    Dec. 12, 2019

(30) Foreign Application Priority Data

Jan. 30, 2017  (EP) ..................................... 17153794

(51) Int. Cl.
| | | |
|---|---|---|
| *H01B 1/00* | (2006.01) | |
| *C09D 5/24* | (2006.01) | |
| *C08G 61/12* | (2006.01) | |
| *C08K 5/134* | (2006.01) | |
| *C08K 5/5415* | (2006.01) | |
| *C08L 25/06* | (2006.01) | |
| *H01B 1/12* | (2006.01) | |

(52) U.S. Cl.
CPC .......... *C08G 61/126* (2013.01); *C08K 5/1345* (2013.01); *C08K 5/5415* (2013.01); *C08L 25/06* (2013.01); *C09D 5/24* (2013.01); *H01B 1/127* (2013.01); *C08G 2261/3247* (2013.01); *C08G 2261/594* (2013.01)

(58) Field of Classification Search
CPC . H01B 1/00; H01B 1/127; H01B 1/20; C09D 5/12; C08L 65/00
See application file for complete search history.

(56) References Cited

U.S. PATENT DOCUMENTS

| | | | |
|---|---|---|---|
| 8,936,735 B2* | 1/2015 | Guntermann .......... | H01B 1/127 252/500 |
| 2005/0202251 A1 | 9/2005 | Elschner et al. | |
| 2009/0148722 A1* | 6/2009 | Louwet ................. | H01G 11/48 428/690 |
| 2014/0134421 A1* | 5/2014 | Hu ........................... | C09D 5/24 428/292.1 |
| 2017/0198155 A1* | 7/2017 | Lovenich ................. | C09D 7/61 |

FOREIGN PATENT DOCUMENTS

| | | |
|---|---|---|
| EP | 0339340 | 11/1989 |
| EP | 0440957 | 8/1991 |
| EP | 1568750 | 8/2005 |
| EP | 2977993 | 1/2016 |
| JP | 2012520354 | 9/2012 |
| JP | 2015078338 | 4/2015 |
| JP | 2016225042 | 12/2016 |
| JP | 2018203861 A * | 12/2018 |
| WO | 2008055834 | 5/2008 |
| WO | 2008141981 | 11/2008 |
| WO | 2014014262 | 1/2014 |
| WO | 2014048561 | 4/2014 |

OTHER PUBLICATIONS

English language machine translation of WO/2014/014262 (pub date Jan. 2014).*
International Search Report and Written Opinion dated May 7, 2018 for International Patent Application PCT/EP2018/050661.
Japanese Office Action dated Mar. 25, 2021 for Japanese Patent Application 2019-540036.

* cited by examiner

*Primary Examiner* — Mark Kopec
(74) *Attorney, Agent, or Firm* — Stradley Ronon Stevens & Young, LLP

(57) ABSTRACT

A liquid composition. The liquid composition comprises
(i) particles comprising a complex of a polythiophene and a polyanion,
(ii) at least one tetraalkyl orthosilicate,
(iii) at least one solvent, and
(iv) gallic acid, at least one derivative of gallic acid or a mixture thereof.
Also provided are a process for the preparation of a liquid composition, a liquid composition obtainable by such a process, a process for the preparation of a layered body, the layered body obtainable by such a process, a layered body and the use of a liquid composition.

4 Claims, No Drawings

COMPOSITIONS USEFUL FOR THE FORMATION OF AN ANTISTATIC LAYER OR AN ELECTROMAGNETIC RADIATION SHIELD

CROSS REFERENCE TO RELATED APPLICATIONS

This application is a U.S. national phase filing of International Patent Application Number PCT/EP2018/050661 filed on Jan. 11, 2018, which claims the priority of European Patent Application Number 17153794.7 filed on Jan. 30, 2017. The disclosures of these applications are hereby incorporated by reference in their entirety.

TECHNICAL FIELD

The present invention relates to a liquid composition which comprises particles comprising a complex of a polythiophene and a polyanion, to a process for the preparation of a liquid composition, to a liquid composition obtainable by such a process, to a process for the preparation of a layered body, to the layered body obtainable by such a process, to a layered body and to the use of a liquid composition.

BACKGROUND

Conductive polymers are increasingly gaining economic importance, since polymers have advantages over metals with respect to processability, weight and targeted adjustment of properties by chemical modification. Examples of known π-conjugated polymers are polypyrroles, polythiophenes, polyanilines, polyacetylenes, polyphenylenes and poly(p-phenylene-vinylenes). Layers of conductive polymers are employed in diverse industrial uses, e.g., as polymeric counter-electrodes in capacitors or for through-plating of electronic circuit boards. The preparation of conductive polymers is carried out chemically or electrochemically by oxidation from monomeric precursors, such as optionally substituted thiophenes, pyrroles and anilines and the particular optionally oligomeric derivatives thereof. In particular, chemically oxidative polymerization is widely used, since it is easy to realize industrially in a liquid medium or on diverse substrates.

A particularly important polythiophene which is used industrially is poly(3,4-ethylenedioxy-thiophene) (PEDOT or PEDT), which is described, for example, in EP 0 339 340 A2 and is prepared by chemical polymerization of 3,4-ethylenedioxythiophene (EDOT or EDT), and which has very high conductivity in its oxidized form. An overview of numerous poly(3,4-alkylenedioxythiophene) derivatives, in particular poly(3,4-ethylenedioxythiophene) derivatives, and their monomer units, syntheses and uses is given by A. Elschner, S. Kirchmeyer, W. Lövenich, U. Merker, and K. Reuter, "*PEDOT Principles and Applications of an Intrinsically Conductive Polymer*," CRC Press (2011). Often 3,4-ethylene-dioxythiophene is polymerized in water in the presence of polyanions such as polystyrene sulfonate (PSS), whereby aqueous compositions are obtained containing a complex of the cationic polythiophene and the polyanion (often referred to as "PEDOT/PSS"). Such a process is, for example, disclosed in EP 0 440 957 A2. Due to the polyelectrolyte properties of PEDOT as a polycation and PSS as a polyanion, these compositions are not a true solution, but rather a dispersion. The extent to which polymers or parts of the polymers are dissolved or dispersed in this context depends on the weight ratio of the polycation and the polyanion, on the charge density of the polymers, on the salt concentration of the environment and on the nature of the surrounding medium. V. Kabanov, Russian Chemical Reviews 74, 3-20 (2005).

PEDOT/PSS-dispersions have acquired particular industrial importance. Transparent, conductive films have found a large number of uses, e.g., as antistatic coatings or as conductive layers in electronic components, for example, as a hole injection layer in organic light-emitting diodes (OLED), as an intermediate layer in organic photovoltaic elements (OPV elements) or as an electromagnetic interference (EMI) shielding material. They are also commonly used for the formation of conductive polymers layers, in particular solid electrolyte layers or polymeric outer layers, in the production of solid electrolyte capacitors.

However, whilst Although providing satisfactory conductivity performance, conductive layers prepared by conventional PEDOT/PSS-dispersions are often characterized by a rapid increase in their surface resistance upon exposure to visible and ultraviolet light. In order to improve the stability towards visible and ultraviolet light, WO 2008/055834 A1 suggests supplementing PEDOT/PSS-dispersions with a polyhydroxy- and/or carboxy group or amide or lactam group containing aliphatic compounds such as pyrogallol, gallic acid esters and polyhydroxy benzoic acids.

PEDOT/PSS-dispersions supplemented with such additives, however, still suffer from the drawback that they exhibit poor mechanical and physical properties. Particularly, the adhesion strength with which they adhere to substrates such as polyethyleneterephthalate (PET) and glass and also the scratch resistance of the conductive layers prepared by conventional PEDOT/PSS-dispersions are often not sufficient, particularly if the conductive layers are used as antistatic coatings or as an electromagnetic radiation shield. In order to improve the adhesion strength and the scratch resistance of PEDOT/PSS-layers, WO 2014/048561 A2 discloses adding adhesion promotors and/or crosslinkers on the basis of organofunctional silanes to the dispersions. However, the disadvantage of the adhesion promoters disclosed in the prior art is that after prolonged storage of PEDOT/PSS-dispersions comprising such adhesion promoters, particularly after prolonged storage of PEDOT/PSS-dispersions that additionally comprise a polyhydroxy- and/ or carboxy group or amide or lactam group containing aliphatic compounds such as those disclosed in WO 2008/ 055834 A1, the dispersions tend to form gels. The supplementation of PEDOT/PSS-dispersions with the organofunctional silanes disclosed in the prior art therefore decreases the storage stability of the dispersions.

SUMMARY

The present invention was based on the object of overcoming the disadvantages resulting from the prior art in connection with liquid compositions comprising polythiophenes, in particular with PEDOT/PSS-dispersions.

In particular, the present invention was based on the object of providing a liquid composition comprising polythiophenes that can be used for the formation of scratch-resistant conductive layers with good adhesion particularly to substrates such as PET or glass, but which at the same time are also characterized by a sufficient stability towards visible and ultraviolet light and which do not tend to form gels after prolonged storage as it is known from polythiophene-dispersions known in the prior art. Particularly, the liquid compositions should be characterized in that even after storage of the compositions for a period of at least 6 months they should not form gels and the long storage of the liquid compositions should not negatively affect the viscosity of the liquid compositions or the surface resistance, the transmission and the scratch resistance of conductive layers prepared with these compositions.

DETAILED DESCRIPTION

Embodiments of the present invention include the following:

|1| A liquid composition comprising:
 i) particles comprising a complex of a polythiophene and a polyanion,
 ii) at least one tetraalkyl orthosilicate,
 iii) at least one solvent, and
 iv) gallic acid, at least one derivative of gallic acid or a mixture thereof.

|2| The liquid composition according to embodiment |1|, wherein the complex is a complex of poly(3,4-ethylenedioxythiophene) and an anion of polystyrene sulfonic acid (PEDOT/PSS).

|3| The liquid composition according to embodiment |1| or |2|, wherein the liquid composition comprises the complex of a polythiophene and a polyanion, preferably PEDOT/PSS, in an amount of 0.001 to 2.5 wt.-%, more preferably 0.005 to 1.0 wt.-% and most preferably 0.01 to 0.5 wt.-%, in each case based on the total weight of the liquid composition.

|4| The liquid composition according to any one of embodiments |1| to |3|, wherein the at least one tetraalkyl orthosilicate is selected from the group consisting of tetramethyl orthosilicate, tetraethyl orthosilicate, tetrapropyl orthosilicate, tetrabutyl orthosilicate, tetrapentyl orthosilicate, orthosilicate, an at least partially hydrolysed product of these orthosiliscates and a mixture of at least two of these orthosiliscates.

|5| The liquid composition according to embodiment |4|, wherein the tetraalkyl orthosilicate is tetraethyl orthosilicate (TEOS).

|6| The liquid composition according to any one of embodiments |1| to |5|, wherein the liquid composition comprises component ii), preferably TEOS, in an amount of 0.01 to 15 wt.-%, more preferably 0.1 to 10 wt.-% and most preferably 1 to 5 wt.-%, in each case based on the total weight of the liquid composition.

|7| The liquid composition according to any one of embodiments |1| to |6|, wherein the at least one solvent is selected from the group consisting of water, alcohols, diacetone alcohols, aliphatic ketones, or a mixture of at least two of these solvents.

|8| The liquid composition according to embodiment |7|, wherein at least 95 wt.-%, more preferably at least 99 wt.-%, even more preferably at least 99.5 wt.-% and even more preferably at least 99.9 wt.-% of the total amount of solvents iii) in the liquid composition is based on water or a mixture of water and an alcohol selected from the group consisting of methanol, ethanol, n-propanol and isopropanol.

|9| The liquid composition according to embodiment |7| or |8|, wherein the solvent is a mixture of water and ethanol in a volume ratio water:ethanol in the range from 1:1 to 1:25, preferably in the range from 1:2 to 1:20 and more preferably in the range from 1:3 to 1:10.

|10| The liquid composition according to any one of embodiments |1| to |9|, wherein the derivative of gallic acid is an ester of gallic acid and a sugar.

|11| The liquid composition according to embodiment |10|, wherein the derivative of gallic acid is a gallotannine.

|12| The liquid composition according to embodiment |11|, wherein the gallotannine is tannic acid.

|13| The liquid composition according to any one of embodiments |1| to |9|, wherein the derivative of gallic acid is an alkyl ester, alkenyl ester, cycloalkyl ester, cycloalkenyl ester or aryl ester of gallic acid.

|14| The liquid composition according to embodiment |13|, wherein the ester has 1 to 15 C-atoms, preferably 1 to 6 C-atoms atoms in the alkyl group, the alkenyl group, the cycloalkyl group, the cycloalkenyl group or the aryl group of the ester.

|15| The liquid composition according to embodiment |14|, wherein the ester is methyl gallate, ethyl gallate, propyl gallate or a mixture of at least two of these esters.

|16| The liquid composition according to any one of embodiments |1| to |15|, wherein the liquid composition comprises component iv), preferably a gallotannine, more preferably tannic acid, in an amount of 0.0001 to 5 wt.-%, more preferably 0.001 to 2.5 wt.-% and most preferably 0.01 to 1 wt.-%, in each case based on the total weight of the liquid composition.

|17| The liquid composition according to any one of embodiments |1| to |16|, wherein the pH of the liquid composition is not less than 2.5, more preferably the pH is in the range from 2.5 to 6, even more preferably in the range from 2.5 to 5 and most preferably in the range from 2.5 to 4, wherein the pH is determined at a temperature of 25° C.

|18| The liquid composition according to embodiment |17|, wherein the liquid composition comprises, in addition to components i) to iv), as a further component v) at least one inorganic acid selected from the group consisting of sulfuric acid, hydrochloric acid, nitric acid, phosphoric acid, silicic acid and a mixture of at least two of these inorganic acids, at least one organic acid selected from the group consisting of acetic acid, formic acid, benzoic acid, p-toluensulfonic acid, PSS and a mixture of at least two of these organic acids, a mixture of at least one of these inorganic acids and at least one of these organic acids, or the at least partially deprotonated base form of any of the above mentioned inorganic or organic bases.

|19| The liquid composition according to any one of embodiments |1| to |18|, wherein the liquid composition comprises, in addition to components i) to iv) and optionally v), as a further component vi) at least one further polymer being different from the polythiophene and the polyanion.

|20| The liquid composition according to embodiment |19|, wherein the at least one further polymer vi) is a binder selected from the group consisting of polyvinyl alcohols, polyvinylpyrrolidones, polyvinyl chlorides, polyvinyl acetates, polyvinyl butyrates, polyacrylic esters, polyacrylamides, polymethacrylic esters, polymethacrylamides, polyacrylonitriles, styrene/acrylic ester, vinyl acetate/acrylic ester, ethylene/vinyl acetate copolymers, polybutadienes, polyisoprenes, polystyrenes, polyethers, polyesters, sulfonated polyesters, polycarbonates, polyurethanes, polyamides, polyimides, polysulfones, melamine-formaldehyde resins, epoxy resins, silicone resins, silane resins, celluloses or a mixture of at least two of these binders.

|21| The liquid composition according to any one of embodiments |1| to |20|, wherein the viscosity of the liquid composition is between 0.1 and 100 mPa×s, preferably between 1 and 10 mPa×s and more preferably between 2 and 5 mPa×s (measured with a rheometer at 20° C. and a shear rate of 100 s$^{-1}$).

|22| The liquid composition according to any one of embodiments |1| to |21|, wherein, if $V_{t0}$ is the viscosity of the liquid composition at the point of time t=0 and if $V_{t0+6\ months}$ is the viscosity of the same liquid composition after it has been stored for 6 months at 25° C. in a closed container, the change of the viscosity is not more than 20%, preferably nor more than 10% and more preferably not more than 5%, wherein the change of the viscosity ($\Delta V$) is calculated as follows:

$$(\Delta V)=100\% \times (V_{t0+6\ months}-V_{t0}|)/V_{t0}.$$

|23| The liquid composition according to any one of embodiments |1| to |22|, wherein a conductive layer prepared by applying the liquid composition onto a substrate in a wet film thickness of 12 µm followed by removal of the solvent iii) is characterized by at least one of the following properties ($\alpha 1$) to ($\alpha 3$), preferably by all of these properties:
($\alpha 1$) a sheet resistance in a range from $1 \times 10^2$ to $1 \times 10^{10}$ Ω/sq, preferably in the range from $1 \times 10^3$ to $1 \times 10^9$ Ω/sq;
($\alpha 2$) a transmission of at least 98%, preferably at least 98.5%, more preferably at least 99% and most preferably at least 99.5%; and
($\alpha 3$) a pencil hardness of at least 6H, preferably at least 7H, more preferably at least 8H and most preferably at least 9H.

|24| The liquid composition according to any one of embodiments |1| to |23|, wherein, if $SR_{t0}$, $T_{t0}$ and $PH_{t0}$ are the sheet resistance, the transmission and the pencil hardness of a conductive layer prepared by applying the liquid composition at the point of time t=0 onto a substrate in a wet film thickness of 12 µm followed by removal of the solvent iii) and if $SR_{t0+6\ months}$, $T_{t0+6\ months}$ and $PH_{t0+6\ months}$ are the sheet resistance, the transmission and the pencil hardness of a conductive layer prepared by applying the same liquid composition, after it has been stored for 6 months at 25° C. in a closed container, onto a substrate in a wet film thickness of 12 µm followed by removal of the solvent iii), at least one of the following properties ($\beta 1$) to ($\beta 3$), preferably by all of these properties, are fulfilled:
($\beta 1$) the sheet resistance changes by not more than 20%, preferably not more than 10% and most preferably not more than 5%, wherein the change of the sheet resistance ($\Delta SR$) is calculated as follows:

$$(\Delta SR)=100\% \times (|SR_{t0+6\ months}-SR_{t0}|)/SR_{t0};$$

($\beta 2$) the transmission changes by not more than 20%, preferably not more than 10% and most preferably not more than 5%, wherein the change of the transmission ($\Delta T$) is calculated as follows:

$$(\Delta T)=100\% \times (|T_{t0+6\ months}-T_{t0}|)/T_{t0};\ \text{and}$$

($\beta 3$) the pencil hardness changes by not more than 20%, preferably not more than 10% and most preferably not more than 5%, wherein the change of the pencil hardness ($\Delta PH$) is calculated as follows:

$$(\Delta PH)=100\% \times (|PH_{t0+6\ months}-PH_{t0}|)/PH_{t0}.$$

|25| A process for the preparation of a liquid composition, the process comprising the process steps of
I) providing a first liquid composition comprising particles comprising a complex of a polythiophene and a polyanion;
II) providing a second liquid composition comprising gallic acid or at least one derivative of gallic acid;
III) mixing the first liquid composition together with the second liquid composition and at least one tetraalkyl orthosilicate;

IV) adjusting the pH of the mixture to a value of not less than 2.5, more preferably to a value in the range from 2.5 to 6, even more preferably in the range from 2.5 to 5 and most preferably in the range from 2.5 to 4, wherein the pH is determined at a temperature of 25° C.

|26| The process according to embodiment |25|, wherein the complex is a complex of poly(3,4-ethylenedioxythiophene) and an anion of polystyrene sulfonic acid (PEDOT/PSS), the at least one tetraalkyl orthosilicate is as defined in embodiments |4| or |5|, and the at least one derivative of gallic acid is as defined in embodiments |10| to |15|.

|27| The process according to embodiment |25| or |26|, wherein the first liquid composition preferably is an aqueous PEDOT/PSS-dispersion.

|28| The process according to any one of embodiments |25| to |27|, wherein the second liquid composition preferably is an ethanolic solution of tannic acid.

|29| A liquid composition obtainable by the process according to any one of embodiments |25| to |28|.

|30| A process for the preparation of a layered body, the process comprising the process steps:
A) the provision of a substrate;
B) the application of the liquid composition according to any one of embodiments |1| to |24| or |29| onto this substrate; and
C) the at least partial removal of the at least one solvent iii) from the liquid composition to obtain a layered body comprising an electrically conductive layer coated onto the substrate.

|31| A layered body, obtainable by the process according to embodiment |30|.

|32| The layered body according to embodiment |31|, wherein the conductive layer of the layered body is characterized by at least one of the following properties ($\alpha 1$) to ($\alpha 3$), preferably by all of these properties:
($\alpha 1$) a sheet resistance in a range from $1 \times 10^2$ to $1 \times 10^{10}$ Ω/sq, preferably in the range from $1 \times 10^3$ to $1 \times 10^9$ Ω/sq;
($\alpha 2$) a transmission of at least 98%, preferably at least 98.5%, more preferably at least 99% and most preferably at least 99.5%; and
($\alpha 3$) a pencil hardness of at least 6H, preferably at least 7H, more preferably at least 8H and most preferably at least 9H.

|33| A layered body, comprising:
a) a substrate; and
b) an electrically conductive layer coated onto the substrate;
wherein the electrically conductive layer comprises
i) particles comprising a complex of a polythiophene and a polyanion,
ii) at least one tetraalkyl orthosilicate, and
iii) gallic acid, at least one derivative of gallic acid or a mixture thereof.

|34| The layered body according to embodiment |33|, wherein the complex is a complex of poly(3,4-ethylenedioxythiophene) and an anion of polystyrene sulfonic acid (PEDOT/PSS), the at least one tetraalkyl orthosilicate is as defined in embodiments |4| or |5|, and the at least one derivative of gallic acid is as defined in embodiments |10| to |15|.

|35| The layered body according to embodiment |33| or |34|, wherein the conductive layer of the layered body is characterized by at least one of the following properties ($\alpha 1$) to ($\alpha 3$), preferably by all of these properties:
($\alpha 1$) a sheet resistance in a range from $1 \times 10^2$ to $1 \times 10^{10}$ Ω/sq, preferably in the range from $1 \times 10^3$ to $1 \times 10^9$ Ω/sq;

(α2) a transmission of at least 98%, preferably at least 98.5%, more preferably at least 99% and most preferably at least 99.5%; and (α3) a pencil hardness of at least 6H, preferably at least 7H, more preferably at least 8H and most preferably at least 9H.

[36] Use of the liquid composition according to any one of embodiments |1| to |24| or |29| for the production of an antistatic coating or an electromagnetic radiation shield or for the preparation of a hole-transport layer in an organic light emitting diode (OLED) or in an organic photovoltaic (OPV) element.

A contribution towards achieving the abovementioned objects is made by a liquid composition comprising i) particles comprising a complex of a polythiophene and a polyanion,
ii) at least one tetraalkyl orthosilicate,
iii) at least one solvent, and
iv) gallic acid, at least one derivative of gallic acid or a mixture thereof.

Surprisingly, it has been discovered that the very special combination of tetraalkyl orthosilicates as an additive to increase the adhesion and scratch resistance of conductive layers based on complexes of a polythiophene and a polyanion and gallic acid or a derivative of gallic acid as an additive to increase the stability of conducting layers towards visible and ultraviolet lights leads to dispersions by which not only conductive layers with these advantageous properties can be prepared, but which at the same time are also characterized by an increased storage stability compared to the dispersions of the prior art comprising similar additives.

The liquid composition according to the present invention comprises, as component i), particles comprising a polythiophene. In this context, polythiophenes having the general formula

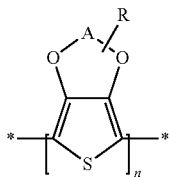

are particularly preferred, in which

A represents an optionally substituted $C_1$-$C_5$-alkylene radical, and

R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, wherein 0 to 8 radicals R can be bonded to A and, in the case of more than one radical, can be identical or different.

The polythiophenes preferably in each case carry H on the end groups.

In the context of the invention, $C_1$-$C_5$-alkylene radicals A are preferably methylene, ethylene, n-propylene, n-butylene or n-pentylene. $C_1$-$C_{18}$-alkyl R preferably represent linear or branched $C_1$-$C_{18}$-alkyl radicals, such as methyl, ethyl, n- or iso-propyl, n-, iso-, sec- or tert-butyl, n-pentyl, 1-methyl-butyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl. $C_5$-$C_{12}$-cycloalkyl radicals R represent, for example, cyclopentyl, cyclohexyl, cycloheptyl, cyclooctyl, cyclononyl or cyclodecyl. $C_5$-$C_{14}$-aryl radicals R represent, for example, phenyl or naphthyl, and $C_7$-$C_{18}$-aralkyl radicals R represent, for example, benzyl, o-, m-, p-tolyl, 2,3-, 2,4-, 2,5-, 2,6-, 3,4-, 3,5-xylyl or mesityl. The preceding list serves to illustrate the invention by way of example and is not to be considered conclusive.

In the context of the invention, numerous organic groups are possible as optionally further substituents of the radicals A and/or of the radicals R, for example alkyl, cycloalkyl, aryl, aralkyl, alkoxy, halogen, ether, thioether, disulphide, sulphoxide, sulphone, sulphonate, amino, aldehyde, keto, carboxylic acid ester, carboxylic acid, carbonate, carboxylate, cyano, alkylsilane and alkoxysilane groups and carboxamide groups.

Polythiophenes in which A represents an optionally substituted $C_2$-$C_3$-alkylene radical are particularly preferred. Poly(3,4-ethylenedioxythiophene) is very particularly preferred as the polythiophene.

The polythiophenes can be neutral or cationic. In preferred embodiments they are cationic, "cationic" relating only to the charges on the polythiophene main chain. The polythiophenes can carry positive and negative charges in the structural unit, depending on the substituent on the radicals R, the positive charges being on the polythiophene main chain and the negative charges optionally being on the radicals R substituted by sulphonate or carboxylate groups. In this context, the positive charges of the polythiophene main chain can be partly or completely satisfied by the anionic groups optionally present on the radicals R. Overall, in these cases the polythiophenes can be cationic, neutral or even anionic. Nevertheless, in the context of the invention they are all regarded as cationic polythiophenes, since the positive charges on the polythiophene main chain are the deciding factor. The positive charges are not shown in the formulae, since their precise number and position cannot be determined absolutely. However, the number of positive charges is at least 1 and at most n, where n is the total number of all recurring units (identical or different) within the polythiophene.

For compensation of the positive charge of the polythiophene, the particles comprising the conductive polymer furthermore comprise a polyanion which is preferably based on polymers functionalized with acid groups. Anions of polymeric carboxylic acids, such as polyacrylic acids, polymethacrylic acid or polymaleic acids, or of polymeric sulphonic acids, such as polystyrenesulphonic acids and polyvinylsulphonic acids, are possible in particular as the polyanion. These polycarboxylic and -sulphonic acids can also be copolymers of vinylcarboxylic and vinylsulphonic acids with other polymerizable monomers, such as acrylic acid esters and styrene. Polyanions which are furthermore possible are perfluorinated, colloid-forming polyanions, which are commercially obtainable, for example, under the name Nafion®. The molecular weight of the polymers which are functionalized with acid groups and supply the polyanions is preferably 1,000 to 2,000,000, particularly preferably 2,000 to 500,000. The polymers functionalized with acid groups or their alkali metal salts are commercially obtainable, e.g., polystyrenesulphonic acids and polyacrylic acids, or can be prepared by known processes (see, e.g., Houben Weyl, Methoden der organischen Chemie, vol. E 20 Makromolekulare Stoffe, part 2, (1987), p. 1141 et seq.). A particularly preferred polyanion is an anion of polystyrene sulfonic acid.

The particles i) comprise a complex of a polythiophene and a polyanion, particularly preferably a PEDOT/PSS-complex. Such complexes are obtainable by polymerizing the thiophene monomers, preferably 3,4-ethylenedioxythiophene, oxidatively in a preferably aqueous solution in the presence of the polyanions, preferably by oxidatively polymerizing 3,4-ethylene-dioxythiophene in the presence of an anion of polystyrenesulphonic acid.

The weight average particle diameter ($d_{50}$) of the particles i) comprising the complex of a polythiophene and a polyanion is typically in the range from 10 nm to 2,000 nm, more preferably in the range from 20 nm to 500 nm, and more preferably in the range from 25 nm to 50 nm. The $d_{50}$-value of the diameter distribution states that 50% of the total weight of all the particles i) can be assigned to those particles which have a diameter of less than or equal to the $d_{50}$ value (the $d_{50}$-value thus represents the weight average particle diameter). As in the case of PEDOT/PSS-particles dispersed in an aqueous solution, the particles are usually present in the form of swollen gel particles, the above mentioned particle sizes refer to the particles size of the swollen gel particles and are determined using an ultracentrifuge measurement.

According to a preferred embodiment of the liquid composition according to the present invention the liquid composition comprises the complex i) of a polythiophene and a polyanion, preferably PEDOT/PSS, in an amount of 0.001 to 2.5 wt.-%, more preferably 0.005 to 1.0 wt.-% and most preferably 0.01 to 0.5 wt.-%, in each case based on the total weight of the liquid composition.

The liquid composition according to the present invention further comprises, as component ii), at least one tetraalkyl orthosilicate. Preferred tetraalkyl orthosiliscates are selected from the group consisting of tetramethyl orthosilicate, tetraethyl orthosilicate, tetrapropyl orthosilicate, tetrabutyl orthosilicate, tetrapentyl orthosilicate, orthosilicate, an at least partially hydrolysed product of these orthosiliscates and a mixture of at least two of these orthosiliscates, wherein the use of tetraethyl orthosilicate (TEOS) is particularly preferred.

According to a preferred embodiment of the liquid composition according to the present invention the liquid composition comprises component ii), preferably TEOS, in an amount of 0.01 to 15 wt.-%, more preferably 0.1 to 10 wt.-% and most preferably 1 to 5 wt.-%, in each case based on the total weight of the liquid composition. If the liquid composition comprises a mixture of two or more tetra-alkoxysilanes as component ii), the above amounts represent the total amount of these components.

The liquid composition according to the present invention further comprises, as component iii), at least one solvent. A "solvent" within the meaning of the present invention preferably includes any component of the liquid composition that, when present as an isolated compound, is a liquid at room temperature. Preferably, the particles i) comprising the complex of a polythiophene and a polyanion are dispersed in the solvent iii). The liquid composition is thus preferably a dispersion.

Preferred solvents iii) are water, water-miscible solvents, in particular those selected from the group consisting of aliphatic alcohols, such as methanol, ethanol, n-propanol and isopropanol, diacetone alcohols, aliphatic ketones, such as acetone and methyl ethyl ketone or a mixture of at least two of these solvents. In this context it is furthermore preferred that at least 95 wt.-%, more preferably at least 99 wt.-%, even more preferably at least 99.5 wt.-% and even more preferably at least 99.9 wt.-% of the total amount of solvents iii) in the liquid composition is based on water or a mixture of water and an alcohol selected from the group consisting of methanol, ethanol, n-propanol and isopropanol.

According to a particularly preferred embodiment of the liquid composition according to the present invention the solvent iii) is a mixture of water and ethanol in a volume ratio water:ethanol in the range from 1:1 to 1:25 and more preferably in the range from 1:3 to 1:10.

The liquid composition according to the present invention further comprises, as component iv), gallic acid, a derivative of gallic acid or a mixture thereof, wherein preferred derivatives of gallic acid are gallic acid esters. Particularly preferred gallic acid esters are esters of gallic acid and sugar which are often called tannin or gallotannins (cf. Römpp Chemie, 10th edition (1999), page 4391). Further preferred esters of gallic acid are alkyl esters, alkenyl esters, cycloalkyl esters, cycloalkenyl esters and aryl esters of gallic acid, preferably those having 1 to 15 C-atoms, preferably 1 to 6 C-atoms in the alkyl group, the alkenyl group, the cycloalkyl group, the cycloalkenyl group or the aryl group of the ester. Most preferred derivatives of gallic acid are gallo-tannines, such as tannic acid, or alkylesters of gallic acid such as methyl gallate, ethyl gallate, propyl gallate or a mixture of at least two of these esters.

According to a preferred embodiment of the liquid composition according to the present invention the liquid composition comprises component iv), preferably a gallotannine, more preferably tannic acid, in an amount of 0.0001 to 5 wt.-%, more preferably 0.001 to 2.5 wt.-% and most preferably 0.01 to 1 wt.-%, in each case based on the total weight of the liquid composition. If the liquid composition comprises a mixture of gallic acid and a derivative thereof or a mixture of at least two derivatives of gallic acid, the above amounts represent the total amount of these components.

According to a preferred embodiment of the liquid composition according to the present invention the pH of the liquid composition is not less than 2.5, more preferably the pH is in the range from 2.5 to 6, even more preferably in the range from 2.5 to 5 and most preferably in the range from 2.5 to 4, wherein the pH is determined at a temperature of 25° C. The pH can be adjusted by adding appropriate acids to a composition that has been prepared by mixing components i) to iv). Suitable acids are inorganic acid such as sulfuric acid, hydrochloric acid, nitric acid, phosphoric acid, silicic acid or a mixture of at least two of these inorganic acids, or organic acids such as acetic acid, formic acid, benzoic acid, p-toluensulfonic acid, PSS or a mixture of at least two of these organic acids, or a mixture of at least one of these inorganic acids and at least one of these organic acids. The composition according to the present invention may therefore comprise, in addition to components i) to iv), as a further component v) at least one inorganic acid selected from the group consisting of sulfuric acid, hydrochloric acid, nitric acid, phosphoric acid, silicic acid and a mixture of at least two of these inorganic acids, at least one organic acid selected from the group consisting of acetic acid, formic acid, benzoic acid, p-toluensulfonic acid, PSS and a mixture of at least two of these organic acids, a mixture of at least one of these inorganic acids and at least one of these organic acids, or the at least partially deprotonated base form of any of the above mentioned inorganic or organic bases.

Liquid composition according to the present invention may further comprise wherein this at least one further polymer vi) preferably serves as a binder. Suitable binders are selected from the group consisting of polyvinyl alcohols, polyvinylpyrrolidones, polyvinyl chlorides, polyvinyl acetates, polyvinyl butyrates, polyacrylic esters, polyacrylamides, polymethacrylic esters, polymethacrylamides, polyacrylonitriles, styrene/acrylic ester, vinyl acetate/acrylic ester, ethylene/vinyl acetate copolymers, polybutadienes, polyisoprenes, polystyrenes, polyethers, polyesters, sulfonated polyesters, polycarbonates, polyurethanes, polyamides, polyimides, polysulfones, melamine-formaldehyde resins, epoxy resins, silicone resins, silane resins, celluloses or a mixture of at least two of these binders. Further useful polymeric binders are preferably also those which are obtained by adding crosslinkers, for example melamine compounds, capped isocyanates or functional silanes, for example 3-glycidoxypropyltrialkoxysilane, tetraethyl orthosilicate and tetraethyl orthosilicate hydrolyzate, to crosslinkable polymers, for example polyurethanes, polyacrylates or polyolefins, and subsequently crosslinking. Water-soluble binders, such as sulfonated polyesters, are particularly preferred.

liquid composition according to the present invention may further comprise vii) being different from the above mentioned components i) to vi). Suitable additives vii) are, for example, surface-active substances, e.g., anionic surfactants, such as alkylbenzenesulphonic acids and salts, paraffin sulphonates, alcohol sulphonates, ether sulphonates, sulphosuccinates, phosphate esters, alkyl ether carboxylic acids or carboxylates, cationic surfactants, such as quaternary alkylammonium salts, nonionic surfactants, such as linear alcohol ethoxylates, oxo alcohol ethoxylates, alkylphenol ethoxylates or alkyl polyglucosides, in particular surfactants that are commercially available under the trademarks Dynol® and Zonyl®. Also suitable as additives are high-boiling compounds such as propylene glycol, ethylene glycol, diethylene glycol, dimethyl sulphoxide (DMSO), methylacetamide, dimethylacetamide, dimethylformamide, N-methylpyrrolidone, N-cyclohexylpyrrolidone or a mixture of at least two of these solvents, wherein DMSO is most preferred. Addition of these high-boiling solvents to the liquid compositions according to the present invention in an amount of 0.1 to 10 wt. %, preferably 0.5 to 5 wt.-%, can lead to a significant increase in conductivity.

The viscosity of the liquid composition according to the present invention is preferably between 10 and 100 mPa×s (measured with a rheometer at 20° C. and a shear rate of 100 s$^{1}$). More preferably, the viscosity is between 1 and 10 mPa×s, particularly preferably between 2 and 5 mPa×s. The adjustment of the viscosity can, for example, be accomplished by adding appropriate rheology modifiers as a further additive vii).

Furthermore, it is preferred that, if $V_{t0}$ is the viscosity of the liquid composition at the point of time t=0 and if $V_{t0+6\ months}$ is the viscosity of the same liquid composition after it has been stored for 6 months at 25° C. in a closed container, the change of the viscosity is not more than 20%, preferably not more than 10% and more preferably not more than 5%, wherein the change of the viscosity (ΔV) is calculated as follows:

$$(\Delta V)=100\% \times (V_{t0+6\ months}-V_{t0})/V_{t0}.$$

It is furthermore preferred that a conductive layer prepared by the liquid composition according to the present invention is characterized by at least one of the following properties (α1) to (α3), preferably by all of these properties.

(α1) a sheet resistance in a range from $1\times10^2$ to $1\times10^{10}$ Ω/sq, preferably in the range from $1\times10^3$ to $1\times10^9$ Ω/sq;

(α2) a transmission of at least 98%, preferably at least 98.5%, more preferably at least 99% and most preferably at least 99.5%; and (α3) a pencil hardness of at least 6H, preferably at least 7H, more preferably at least 8H and most preferably at least 9H.

In this context it is particularly preferred that, if $SR_{t0}$, $T_{t0}$ and $PH_{t0}$ are the sheet resistance, the transmission and the pencil hardness of a conductive layer prepared by applying the liquid composition at the point of time t=0 onto a substrate in a wet film thickness of 12 μm followed by removal of the solvent iii) and if $SR_{t0+6\ months}$, $T_{t0+6\ months}$ and $PH_{t0+6\ months}$ are the sheet resistance, the transmission and the pencil hardness of a conductive layer prepared by applying the same liquid composition, after it has been stored for 6 months at 25° C. in a closed container, onto a substrate in a wet film thickness of 12 μm followed by removal of the solvent iii), at least one of the following properties (β1) to (β3), preferably by all of these properties, are fulfilled:

(β1) the sheet resistance changes by not more than 20%, preferably not more than 10% and most preferably not more than 5%, wherein the change of the sheet resistances (ΔSR) is calculated as follows:

$$(\Delta SR)=100\% \times (SR_{t0+6\ months}-SR_{t0})/SR_{t0};$$

(β2) the transmission changes by not more than 20%, preferably not more than 10% and most preferably not more than 5%, wherein the change of the transmission (ΔT) is calculated as follows:

$$(\Delta T)=100\% \times (|T_{t0+6\ months}-T_{t0}|)/T_{t0};\ \text{and}$$

(β3) the pencil hardness changes by not more than 20%, preferably not more than 10% and most preferably not more than 5%, wherein the change of the pencil hardness (ΔPH) is calculated as follows:

$$(\Delta PH)=100\% \times (|PH_{t0+6\ months}-PH_{t0}|)/PH_{t0}.$$

A contribution towards achieving the abovementioned objects is made by a process for preparing a liquid composition, the process comprising the process steps of I) providing a first liquid composition comprising particles comprising a complex of a polythiophene and a polyanion, wherein the first liquid composition preferably is an aqueous PEDOT/PSS-dispersion;

II) providing a second liquid composition comprising gallic acid or at least one derivative of gallic acid, wherein the second liquid composition preferably is an ethanolic solution of tannic acid;

III) mixing the first liquid composition together with the second liquid composition and at least one tetraalkyl orthosilicate, preferably with TEOS; and IV) adjusting the pH of the mixture to a value of not less than 2.5, more preferably to a value in the range from 2.5 to 6, even more preferably in the range from 2.5 to 5 and most preferably in the range from 2.5 to 4, wherein the pH is determined at a temperature of 25° C.

In process step I) the first liquid composition is provided comprising particles comprising a complex of a polythiophene and a polyanion, wherein the first liquid composition preferably is an aqueous PEDOT/PSS-dispersion. Such liquid compositions are commercially available or can be produced by oxidatively polymerizing thiophene monomers in the presence of the polyanion in suitable solvents, preferably in water. In process step II) the second liquid composition is provided comprising gallic acid or at least one derivative of gallic acid, wherein the second liquid composition preferably is an ethanolic solution of tannic acid. Such liquid compositions can simply be prepared by dissolving or dispersion gallic acid or the derivative thereof in a solvent, preferably by dissolving tannic acid in ethanol. In process step III) the first liquid composition is mixed together with the second liquid composition and at least one tetraalkyl orthosilicate, preferably with TESO, wherein mixing of these components can be accomplished by any mixing device the person skilled in the art considers as appropriate for mixing together liquid and solid components. In process step IV) the pH of the liquid composition obtained in process step III) is adjusted, wherein for that purpose any of the inorganic or organic acids (or mixtures of these acids) can be used that have already been mentioned in connection with the liquid composition according to the present invention.

The amounts of the individual components used in the process described above are preferably such that the liquid composition that is obtained in process step IV) comprises i) the complex of a polythiophene and a polyanion, preferably PEDOT/PSS, in an amount from 0.001 to 2.5 wt.-%, preferably 0.005 to 1.0 wt.-% and most preferably 0.01 to 0.5 wt.-%, in each case based on the total amount of the liquid composition;

ii) the tetraalkyl orthosilicate, preferably TEOS, in an amount of 0.01 to 15 wt.-%, more preferably 0.1 to 10 wt.-% and most preferably 1 to 5 wt.-%, in each case based on the total weight of the liquid composition; and iii) gallic acid or at least one derivative of gallic acid, preferably tannic acid, in an amount of 0.0001 to 5 wt.-%, more preferably 0.001 to 2.5 wt.-% and most preferably 0.01 to 1 wt.-%, in each case based on the total weight of the liquid composition.

Furthermore, if an aqueous PEDOT/PSS-dispersion is provided in process step I) and an ethanolic solution of tannic acid in process step II), these solutions are preferably mixed in such relative amounts that in the mixture that is obtained in process step IV) the volume ratio water:ethanol is in the range from 1:1 to 1:25, preferably in the range from 1:2 to 1:20 and more preferably in the range from 1:3 to 1:10.

A contribution towards achieving the abovementioned objects is also made by a liquid composition obtainable by the above described process, wherein the properties of such a liquid composition are preferably identical to the properties of the liquid composition according to the present invention.

A contribution towards achieving the abovementioned objects is also made by a process for the production of a layered body, comprising the process steps:

A) the provision of a substrate;

B) the application of the liquid composition according to the present invention or of the liquid composition obtainable by the process according to the present invention onto this substrate; and C) the at least partial removal of the at least one solvent ii) from the liquid composition to obtain a layered body comprising an electrically conductive layer coated onto the substrate.

In process step A) a substrate is first provided, wherein the nature of the substrate depends on the intended purpose for which the composition according to the present invention is employed. Suitable substrates include films, particularly preferably polymer films, very particularly preferably polymer films of thermoplastic polymers, or glass plates.

In process step B) the liquid composition according to the present invention or the liquid composition obtainable by the process according to the present invention is then applied onto the substrate, it being possible for this application to be carried out by known processes, e.g., by spin coating, impregnation, pouring, dripping on, spraying, misting, knife coating, brushing or printing, for example by ink-jet, screen, gravure, offset or tampon printing, in a wet film thickness of from, for example, 0.5 µm to 250 µm, preferably in a wet film thickness of from 2 µm to 50 µm.

In process step C), at least some of the at least one solvent iii) is then removed from the composition to obtain a layered body comprising an electrically conductive layer coated onto the substrate, this removal preferably being carried out by drying at a temperature in a range of from 20° C. to 200° C. of the substrate coated with the composition.

A contribution towards achieving the above mentioned objects is also made by a layered body which is obtainable by the process described above. In this context it is particularly preferred that the conductive layer of the layered body is characterized by at least one of the following properties ($\alpha$1) to ($\alpha$3), preferably by all of these properties:

($\alpha$1) a sheet resistance in a range from $1 \times 10^2$ to $1 \times 10^{10}$ $\Omega$/sq, preferably in the range from $1 \times 10^3$ to $1 \times 10^9$ $\Omega$/sq;

($\alpha$2) a transmission of at least 98%, preferably at least 98.5%, more preferably at least 99% and most preferably at least 99.5%; and ($\alpha$3) a pencil hardness of at least 6H, preferably at least 7H, more preferably at least 8H and most preferably at least 9H.

A contribution towards achieving the above mentioned objects is also made by a layered body, comprising:

a) a substrate; and b) an electrically conductive layer coated onto the substrate;

wherein the electrically conductive layer comprises i) particles comprising a complex of a polythiophene and a polyanion, ii) at least one tetraalkyl orthosilicate silane, and iii) gallic acid, at least one derivative of gallic acid or a mixture thereof.

Preferred substrates are those that have been mentioned above in connection with the process for the production of a layered body according to the present invention. Preferred particles comprising a complex of a polythiophene and a polyanion, preferred tetraalkyl orthosilicates and preferred derivatives of gallic acids are those components that have been mentioned above in connection with the liquid composition according to the present invention.

Preferably, the conductive layer of the layered body is characterized by at least one of the following properties ($\alpha$1) to ($\alpha$3), preferably by all of these properties:

($\alpha$1) a sheet resistance in a range from $1 \times 10^2$ to $1 \times 10^{10}$ $\Omega$/sq, preferably in the range from $1 \times 10^3$ to $1 \times 10^9$ $\Omega$/sq;

($\alpha$2) a transmission of at least 98%, preferably at least 98.5%, more preferably at least 99% and most preferably at least preferably at least 99.5%; and ($\alpha$3) a pencil hardness of at least 6H, preferably at least 7H, more preferably at least 8H and most preferably at least 9H.

A contribution towards achieving the abovementioned objects is also made by the use of the liquid composition according to the present invention or of the liquid composition obtainable by the process according to the present invention for the production of a layered body comprising a substrate and an electrically conductive layer coated onto the substrate.

The layered bodies that can be prepared with the liquid composition according to the present invention are outstandingly suitable for use as electronic components, in particular as conductive or antistatic components, as transparent heating or as electrodes. They can advantageously be transparent.

These layered bodies can be employed as electronic components, for example also on films, packaging of electronic components, for finishing films of plastics and for coating screens. They can furthermore be used as transparent electrodes in displays, for example as a substitute for indium-tin oxide electrodes, or as electrical conductors in polymeric electronics. Further possible uses are sensors, batteries, solar cells, electrochromic windows (smart windows) and displays and corrosion protection.

In view of the UV-stability and scratch resistance of the coatings obtained with the liquid composition according to the present invention or with the liquid composition obtainable by the process according to the present invention these liquid compositions are particularly useful for the production of an antistatic coating or an electromagnetic radiation shield. They are furthermore particularly useful for the preparation of a hole-transport layer in an organic light emitting diode (OLED) or in an organic photovoltaic (OPV) element.

EXAMPLES

The invention is now explained in more detail with the aid of non-limiting examples.
Test Methods
Determination of the Viscosity Viscosity of the dispersion was determined with a rheometer (Haake type RotoVisco 1 with a DG43 double gap cylinder system) at a shear rate of 100 Hz and 20° C.
Determination of the Solids Content The solids content was determined by gravimetry using a precision scale (Mettler AE 240). First the empty weighing bottle including lid is weighed (Weight A). Then 3 g of dispersion to be analysed is filled quickly into the bottle, closed by the lid and weighed again to determine the exact total weight B. The bottle is then placed in a fume hood without a lid for 3 hours to allow the evaporation of volatile solvents at room temperature. In a second step the bottle is placed in a drying oven with ventilation (Memmert UNB200) at 100° C. for 16-17 hours. When the sample bottle is removed from the oven, immediate coverage by the glass lid is important due to the hygroscopic nature of the dry dispersion material. After 10-15 minutes of cooling down period the bottle is weighed again including the lid to determine weight C. There is always a repeat determination of 2 samples.
Determination of the Conductivity The sheet resistance was measured with a High Resistivity Meter Model Hiresta UX (Model MCP-HT 800) equipped with a Ring-Probe URS RMH214. The measurement was conducted at 100 V.
Pencil Hardness Pencil hardness of a coating is conducted by sliding various pencils of different hardness across a coating deposited on a glass plate according to ISO 15184. The possible impact of the pencil trace on the coating is evaluated by eye.
Transmission The transmission of the coated substrates is determined on a 2-channel spectrometer (Lambda900, PerkinElmer). In order to rule out interferences of the scattered light here, the sample is measured in a photometer sphere (Ulbricht sphere), as a result of which scattered light and transmitted light are detected by the photodetector. The transmission is thus understood as meaning the absorption of the coating and of the substrate. The transmission of the pure substrate is first measured. Melinex 506 films having a thickness of 175 μm are used as the substrate. Thereafter, the coated substrate is measured. The transmission spectra are recorded in the range of visible light, i.e., from 320 nm to 780 nm with a step width of 5 nm.

The standard color value Y of the sample is calculated from the spectra in accordance with DIN 5033, taking as the basis a 10° observer angle and light type D65. The internal transmission is calculated from the ratio of the standard color values of the substrate with coating (Y) to that without coating ($Y_0$). The internal transmission corresponds to $Y/Y_0 \times 100$ in percent. For simplicity, only transmission is referred to the in the following.

EXAMPLES

Example 1 (According to the Invention)

0.1 g tannic acid is dissolved in 84 g of ethanol. 12.6 g Clevios P (Heraeus) is placed in a 250 mL glass beaker. The PEDOT/PSS exhibits a particle size $d_{50}=28$ nm. The solution of tannic acid in ethanol is added to the Clevios P dispersion under stirring. 3.1 g tetraethyl orthosilicate are added to the mixture. The pH is adjusted to more than 2.8 by adding different types of acids. Table 1 summarizes the results. The mixture is stirred for 5-8 hours at room temperature.

A film with a wet film thickness of 12 μm is deposited on glass using a wire bar and subsequently dried at 120° C. for 5 min. The pencil hardness and the sheet resistance are summarized in Table 1. All coatings exhibit a pencil hardness of 8H and a sheet resistance of $4 \times 10^8$ to $3 \times 10^9$ Ohm/sq. The stability of the dispersions is maintained for over 5 hours.

The coated glass shows the following optical properties:

Transmission w/glass: 92%

Transmission w/o glass: 100%

Haze: 0.2%

TABLE 1

Performance of coatings made of dispersions according to the invention comprising different acids to adjust the pH-value.

| | Acetic acid | HNO$_3$ | HCl | PTS |
|---|---|---|---|---|
| pH | 3.3 | 2.8 | 2.9 | 3.0 |
| Pencil hardness | 8 H | 8 H | 8 H | 8 H |
| Sheet resistance Ohm/sq | $4 \times 10^8$ | $3 \times 10^9$ | $9.6 \times 10^8$ | $2.2 \times 10^9$ |
| Stability | No particles after 5 h | No particles after 5 h | No particles after 5 h | No particles after 5 h |

Example 2 (According to the Invention)

A film with a wet film thickness of 12 μm is deposited on glass using a wire bar and subsequently dried at 120° C. for 5 min.

The dispersion prepared in Example 1 (pH-adjustment with acetic acid) is stored for 30 days at room temperature. A film with a wet film thickness of 12 μm is deposited on glass using a wire bar and subsequently dried at 120° C. for 5 min.

The film shows the following properties:
Sheet resistance: $4.0 \times 10^8$ Ohm/sq
Pencil hardness: 9H

Example 3 (Comparative Example)

0.1 g tannic acid is dissolved in 84 g of ethanol. 12.6 g Clevios P (Heraeus) is placed in a 250 mL glass beaker. The PEDOT/PSS exhibits a particle size $d_{50}=28$ nm. The solution of tannic acid in ethanol is added to the Clevios P dispersion under stirring. 3.1 g tetraethyl orthosilicate is added to the mixture. The pH is adjusted to less than 2.5 by different amounts and types of acid. Table 2 summarize the results. The dispersions were not stable for more than 5 hours.

TABLE 2

Stability of dispersions with pH < 2.5.

|  | $HNO_3$ | HCl | PTS |
|---|---|---|---|
| pH | 1.9 | 1.8 | 2.1 |
| Stability | Particle formation within 5 hours | Particle formation within 5 hours | Particle formation within 5 hours |

Comparative Example 4 (not According to the Invention)

0.1 g tannic acid is dissolved in 84 g of ethanol. 12.6 g Clevios P (Heraeus) is placed in a 250 mL glass beaker. The solution of tannic acid in ethanol is added to the Clevios P dispersion under stirring. The pH is adjusted to less than 3.3 by HCl.

The dispersion shows the following properties:
Solids content: 1.19%
pH: <3.3

A film of the above dispersion with a wet film thickness of 12 μm is deposited on glass using a wire bar and subsequently dried at 120° C. for 5 min. The resulting coating exhibits a pencil hardness of less than 3H.

The invention claimed is:

1. A liquid composition comprising:
   i) particles comprising a complex of poly(3,4-ethylenedioxythiophene) and an anion of polystyrene sulfonic acid (PEDOT/PSS),
   ii) tetraethyl orthosilicate (TEOS),
   iii) water or a mixture of water and an alcohol selected from the group consisting of methanol, ethanol, n-propanol and isopropanol, and
   iv) a gallotannine, wherein the liquid comprises a dispersion,
   wherein the liquid further comprises
   v) at least one inorganic acid selected from the group consisting of sulfuric acid, hydrochloric acid, nitric acid, phosphoric acid, silicic acid and a mixture of at least two of these inorganic acids, or at least one organic acid selected from the group consisting of acetic acid, formic acid, benzoic acid, p-toluenesulfonic acid, PSS and a mixture of at least two of these organic acids, or a mixture of at least one of these inorganic acids and at least one of these organic acids, or the at least partially deprotonated base form of any of the above mentioned inorganic or organic acids, and
   wherein the pH of the liquid composition is in the range from 2.5 to 4, the pH being determined at a temperature of 25° C.

2. The liquid composition according to claim 1, wherein a conductive layer prepared from the composition has at least one of the following properties (α1) to (α3):
   (α1) a sheet resistance in a range from $1 \times 10^2$ to $1 \times 10^{10}$ Ω/sq;
   (α2) a transmission of at least 98%; and
   (α3) a pencil hardness of at least 6H.

3. The liquid composition according to claim 2, wherein the conductive layer is characterized by all of the properties (α1) to (α3).

4. The liquid composition according to claim 1, wherein the gallotannine is tannic acid.

* * * * *